(12) United States Patent
Mayer et al.

(10) Patent No.: US 12,427,950 B2
(45) Date of Patent: Sep. 30, 2025

(54) METHOD FOR DETERMINING ACTUAL DELIVERY VOLUME FOR DOSING PUMP INTENDED FOR DELIVERING SUBSTANCE FROM CONTAINER FOR USE IN VEHICLE WASHING SYSTEM

(71) Applicant: WASHTECH HOLDING GmbH, Augsburg (DE)

(72) Inventors: Stefan Mayer, Neusäß (DE); Andreas Sattler, Munich (DE); David Stecher, Monheim (DE)

(73) Assignee: WASHTECH HOLDING GmbH, Augsburg (DE)

( * ) Notice: Subject to any disclaimer, the term of this patent is extended or adjusted under 35 U.S.C. 154(b) by 44 days.

(21) Appl. No.: 18/201,081

(22) Filed: May 23, 2023

(65) Prior Publication Data
US 2023/0373446 A1    Nov. 23, 2023

(30) Foreign Application Priority Data
May 23, 2022  (EP) ..................... 22174828

(51) Int. Cl.
  *B60S 3/04*    (2006.01)
(52) U.S. Cl.
  CPC ......... *B60S 3/04* (2013.01); *B08B 2203/0217* (2013.01)
(58) Field of Classification Search
  None
  See application file for complete search history.

(56) References Cited

U.S. PATENT DOCUMENTS 9,802,579 B2 * 10/2017 Anderson ................ B60S 3/04
10,400,762 B2 * 9/2019 Burazer ................ G01F 25/10
(Continued)

FOREIGN PATENT DOCUMENTS

DE  202012103143 U1  11/2013
DE  102017121172 A1  3/2019
(Continued)

OTHER PUBLICATIONS

Extended European Search Report issued in European U.S. Appl. No. 22/174,828 dated Feb. 8, 2023. English translation not available.

*Primary Examiner* — Peter J Macchiarolo
*Assistant Examiner* — Jermaine L Jenkins
(74) *Attorney, Agent, or Firm* — Weber Rosselli & Cannon LLP

(57) ABSTRACT

A computer-implemented method for determining a delivery volume for use in a vehicle washing system. The method includes reading in a container data record for the container from which the substance is to be delivered by means of the dosing pump; reading in a digital level value representing a level measured in the container by means of at least one analog level sensor or reading in a digital pressure value representing a pressure measured in the container by means of at least one analog pressure sensor and reading in a digital density value for the substance to be delivered by the dosing pump, determining and outputting the delivery volume delivered by the dosing pump in a measuring time interval, based on the read-in digital level value or the read-in digital pressure value and the read-in density value and on the basis of the read-in vessel data record.

21 Claims, 6 Drawing Sheets

(56) References Cited

U.S. PATENT DOCUMENTS

2018/0250719 A1* 9/2018 Droege .................. B01F 25/20
2020/0384960 A1* 12/2020 Mayer ................ G06K 7/10386

FOREIGN PATENT DOCUMENTS

| EP | 2885169 | B1 | | 4/2016 | |
|----|---------|----|---|--------|---|
| EP | 3896457 | A1 | | 10/2021 | |
| KR | 20180110603 | A | * | 3/2018 | .............. F01N 9/00 |
| WO | 2019162226 | A1 | | 8/2019 | |

* cited by examiner

METHOD FOR DETERMINING ACTUAL DELIVERY VOLUME FOR DOSING PUMP INTENDED FOR DELIVERING SUBSTANCE FROM CONTAINER FOR USE IN VEHICLE WASHING SYSTEM

The present invention relates to a method, a computing unit, a computer program for computer-implemented determination of an ACTUAL delivery volume for a dosing pump used in a vehicle washing system, the use of such a method for automatic calibration of a dosing pump, a computing unit intended for execution of the method, a dosing system, a vehicle washing system with a dosing system, and a computer program product.

Car washes are known for washing vehicles and can be operated, for example, as gantry car washes or car wash lines. These washing systems have a large number of working units that have to be operated, depending on the washing program. The working units (aggregates) are partly configured to apply washing substances, such as detergents, or substances used in the cleaning process, such as drying aids (hereinafter referred to as "substance" for short) to the vehicle surface. These agents summarized under the term substances can be provided in different aggregate states, for example as a fluid provided in a container by a supplier. A dosing pump can be used to deliver the substance from the container in such a way that the desired application concentration of the substance can be achieved. The substance can be delivered directly into the working unit of the washing system or into a mixer or in a delivery system (e.g. hose system or pipe system).

Document WO 2019/162226 A1 describes a method for operating a vehicle washing system by scanning an optical code attached to a transport container for a washing substance using a mobile device to determine control data for the vehicle washing system.

The document DE 20 2012 103143 U1 describes a dosing device with a replaceable storage tank, an integrated storage tank and a dosing pump, in which an additive for a treatment fluid for a vehicle treatment system is kept in stock or delivered. A level meter is arranged in an upper region of the storage tank, or a flow meter is arranged at the outlet opening of the storage tank.

From EP 2 885 169 B1 a dosing device (dosing pump) is known, which is fluid-mechanically coupled to a container system, which has a first exchangeable storage container, which is not refillable and which is provided to the car wash operator pre-filled by a chemical supplier. This first replaceable storage container can be connected to a second container, a fixed integrated storage tank, in order to supply it with the substance via an inlet opening. This storage tank has a fixed shape and size and is not interchangeable, and can only be filled by the fluid mechanical coupling to the first storage tank and is otherwise not refillable or has no refill opening. The storage tank serves as a buffer, so to speak, and feeds a dosing pump.

This system proves to be disadvantageous, as the car wash operator is tied to the fixed container sizes and/or shapes. If, for example, he wants to change the chemical supplier, this may require structural adjustments to the dosing system.

A well-known problem of (e.g. pneumatic) dosing pumps, especially with manual stroke adjustment, is that they become increasingly inaccurate due to manufacturing tolerances as the dosing setting becomes smaller. In order to estimate how much the dosing pump actually delivers at its current operating point (with a known setting value of a setting means and a known stroke), a manual re-measuring process with a measuring cylinder (also called "gauging") is used. This serves to have a reference value as to how high the actual current delivery rate or delivery capacity of the dosing pump of the respective substance is. This procedure is time-consuming and causes cost-intensive measuring activities. It is therefore desirable to create a dosing system in which manual gauging for calibration of the dosing pump can be avoided.

Chemical consumption can differ from vehicle wash to vehicle wash, depending on how long and/or how high the vehicle is. Furthermore, different wash programs cause different consumption of chemical substances. There is therefore a need—among other things for diagnostic purposes—to know the actual amount of substances dosed.

The present invention has therefore set itself the object of creating a way of accurately determining the actual delivery rate of a dosing pump with a manual stroke adjustment, in order to be able to calibrate it automatically. It should be possible to use "simple" dosing pumps which only have fluid-mechanical connections (no electronic ones) and/or are not electrically open or closed loop controlled. Furthermore, the quality of the washing process shall be improved and the consumption of substances to be added shall be reduced. In addition, the process is intended to help reduce costs during commissioning and operation of the washing system.

This object is solved by the enclosed patent claims, in particular by a computer-implemented method, a computing unit, a dosing system and a computer program. Advantageous embodiments of the invention can be found in the following description and/or in the dependent claims.

In a first aspect, the present invention relates to a computer-implemented method for determining an ACTUAL delivery volume for a dosing pump. In particular, a pneumatic dosing pump may be provided as a dosing pump. The dosing pump is intended for delivering a substance from a container. Furthermore, the dosing pump is provided with an adjustment means for manual adjustment of a TARGET delivery volume (delivery rate). The dosing pump is provided or intended for use in a vehicle washing system The method according to the first aspect comprises the following method steps:

In a first step, a container data record is read in for the container from which the dosing pump is to deliver the substance. This is preferably done only once per container or container type.

In a further process step, a digital filling level value (also: digital level value) is read in. The digital filling level value represents a level difference between two points in time or a difference between two levels that were measured at two different points in time. For example, the digital level value can represent a level difference between a first time point and a second time point at which the level was measured respectively. "fs1" can, for example, denote the first level at the first time t1 and "fs2" the second level at the second time t2. The digital level value thus comprises at least two level values for calculation of the difference, which were measured in or at the container by means of at least one analog filling level sensor (also: analog level sensor) at one time each. The level can be measured continuously in a configurable measurement time period.

Alternatively or cumulatively to the previous process step, a digital pressure value can be read in a further process step. The digital pressure value represents a pressure difference between two points in time measured in the container by means of at least one analog pressure sensor. Furthermore, this process step comprises reading in a density value for the substance to be delivered by the dosing pump. The measurement of the pressure and the reading in or determination of the density can be carried out continuously in a configurable measurement time period.

In a further process step (for both variants, which can also be combined), an ACTUAL delivery volume is determined and output, which has actually been delivered by the dosing pump in a measurement time interval. The determination of the ACTUAL delivery volume can be based on (or can be in response to) the digital level value and on the read-in container data record. Alternatively or cumulatively, the determination of the ACTUAL delivery volume can be based on (or can be in response to) the digital pressure value(s) and the read-in density value and based on the read-in container data record. The determination of the ACTUAL delivery volume can be activated (or deactivated) as required, in particular, for example, for calibrating the dosing pump for a container.

The computer-implemented method for determining an ACTUAL delivery volume can basically be operated for a dosing pump and/or executed on a computer unit which is in data exchange with the dosing pump and/or which has a man-machine interface. The computer-implemented method for determining an ACTUAL delivery volume can also be executed locally on a computer unit of a dosing pump.

With the present invention, the true ACTUAL delivery volume of the dosing pump can be determined, resulting in advantages in terms of quality and, among other things, in the area of forecasting consumption and thus an efficient supply of required substances. Furthermore, the determined ACTUAL delivery volume can be used for diagnostic purposes in the vehicle washing system and for the specific and consumption-based calculation of charges or prices, in order to draw conclusions on the economic efficiency and/or the functionality.

Furthermore, it has proven advantageous that the number of strokes of the dosing pump is continuously recorded and stored, in particular in an associated manner to the measured values (measured level and/or measured pressure and read density). This makes it possible to determine the determined ACTUAL delivery volume per stroke (as stroke volume). This enables a much finer or more accurate statement to be made about the consumption of the substance. Determination of the ACTUAL delivery volume is basically possible from an adjustable minimum number of strokes and thus from an adjustable minimum delivery volume. The higher this minimum number is set or selected, the more accurate the determination of the ACTUAL delivery volume. Subsequently, the determination of the ACTUAL delivery volume can be activated continuously, cyclically or automatically after configurable events (e.g. preset time intervals, container change).

For the purposes of the present invention, the dosing pump is to be understood as a dosing pump driven by a medium. In the prior art, dosing pumps are known, among other things, as positive displacement pumps (Verdrängerpumpen). Dosing pumps deliver a defined volume per revolution, stroke and/or time independently of the pressure conditions at an inlet and an outlet of the dosing pump. The dosing pump preferably has a manual adjustment option for the target delivery volume. The dosing pump does not have any electronic or electromechanical elements for control/operation. The dosing pump provided has only mechanical connections (input/output), for fluid-mechanical connection of the dosing pump in particular to a container. A substance can be delivered from the container using the aforementioned dosing pump and provided to a working unit or operating means of the vehicle washing system, for example, via a line. A reciprocating piston pump, for example, can be provided as the dosing pump. Other dosing pumps, such as hose pumps, diaphragm pumps, gear pumps or other positive displacement pumps can also be provided.

The energy supply for operating the dosing pump is via compressed air (pneumatic) or using water. The clocking takes place via a valve arrangement, which can be arranged in the vehicle washing system. The timing can only be varied to a limited extent. The delivery rate of the dosing pump can therefore be controlled mainly via the mechanical adjustment of the setting means (e.g. a setting wheel and in particular a rotary wheel on the dosing pump) for setting the stroke path. In particular, the stroke path and thus the movement of the reciprocating piston can be adjusted via the adjusting means. The adjusting means can be adjusted from at least one first position to at least one second position and/or vice versa by means of at least one manual actuation. The adjustment means is preferably arranged directly on the dosing pump.

Alternatively, the dosing pump can be an electrically controlled dosing pump, which can be configured with a digital and/or analog input for control and monitoring. The dosing pump can be addressed and controlled by a control unit via the inputs mentioned. The delivery rate of the dosing pump can be adjusted via a stroke frequency change provided by the control unit. The dosing pump can further have an electronic input for providing status information. For example, information for monitoring the fill level in the container can be provided.

In the sense of the present invention, the vehicle washing system (also abbreviated to washing system) is configured for cleaning vehicles, in particular non-rail-bound motor vehicles. It may be a car wash or a gantry car wash. Alternatively, the car wash may be a self-service car wash in which the user uses manually operated implements to clean his vehicle himself, or it may be a car wash for commercial vehicles. These different embodiments of a car wash are known from the prior art and need no further explanation.

Furthermore, for the purposes of the present invention, the term "container" is to be understood as a tank or vessel device which has a fluid-mechanical connection to the dosing pump and a cavity for receiving a substance. Via said container, the dosing pump can be fed with the substance contained in the container. The container can be variable in its shape, construction and/or size. The specification of the shape, design and/or size of the container is not absolutely necessary for the determination of the ACTUAL delivery volume actually delivered by the dosing pump according to the invention. The container can be a transport canister of different sizes (e.g. 25I, 30I, 200I) or a—in comparison—smaller machine canister (e.g. 5I, 10I). The container can have a refill opening that is closable, in particular reclosable. Thus, the container can advantageously be refillable. The container is preferably closed and can have a sensor system for recording measured values.

The container can be provided with a pressure sensor system. The pressure sensor system can comprise at least one pressure sensor. Pressure sensors are known in the prior art. At least one absolute pressure sensor, one differential pressure sensor and/or one relative pressure sensor may be provided as pressure sensors. The at least one pressure sensor can be located inside the container at the container bottom for direct pressure measurement.

The pressure measurement can alternatively or cumulatively also be carried out indirectly via a hydrostatic external pressure measurement. With this type of pressure measurement, compressed air can be introduced at the bottom of the container via a mobile lance. The actual pressure measurement is based on the pressure building up in the gas supply system, which is applied by the substance via the lance. This external pressure measurement requires an open container to allow the escape of the compressed air flowing out of the lance.

Alternatively or cumulatively, the container can be provided with a filling level sensor system(also: level sensor system). The level sensor system comprises at least one level sensor. The level sensor can be configured, for example, as a float which is movably inserted in the container along the height axis. The level of a substance in the container or the position of the float can be determined via a series of electronic contacts, e.g. on an electromagnetic basis, such as reed contacts, which are arranged at predefined intervals along the height axis.

Furthermore, for the purposes of the present invention, the delivery volume is to be understood as the volume of the substance delivered by the dosing pump in a specific measuring period (delivery volume flow). The delivery volume can be the volume of all displacement elements of the dosing pump displaced by stroke or other cycle during one stroke movement of the reciprocating piston. The delivery volume can be specified, for example, in $cm^3$.

The ACTUAL delivery volume is the actual delivery volume determined (volume delivered by the dosing pump) per unit of time.

The TARGET delivery volume is to be understood as the volume per unit of time set (e.g. manually via an adjustment means, such as a rotary wheel) on the mechanical dosing pump and/or the expected delivery volume per unit of time.

To ensure that the ACTUAL delivery volume corresponds to the TARGET delivery volume and does not deviate from it, an automatic calibration process of the dosing pump is advantageously provided.

Furthermore, for the purposes of the present invention, the term "substance" is to be understood to mean any substance which is stored in the container and can be supplied to the vehicle washing system using the dosing pump or used by it for washing, irrespective of its aggregate state. The substance may include, for example, one or more of the chemicals necessary for cleaning the vehicle and/or supplied to the working units (aggregates) and/or operating means of the vehicle washing system during the washing process. The substance may also be water in various states of treatment (softened, osmosis water, etc.) or the substance may contain water.

For the purposes of the present invention, the container data record is an electronic data record provided for the container, preferably stored in digital form. The container data record contains information about the design, size and/or a holding volume of the container, for example, in the case of a rectangular container, information about the length and width and only optionally information about the height. Cumulatively, the container data record may contain information about the type of substance, the amount of substance (fill volume value), and/or the date of manufacture of the substance. The container data record may be provided in a storage medium and may be digitally read out and processed by a computing unit. Further, the container data record may include information about the substance contained in the container (type of washing active substance). Alternatively or cumulatively, the container data record includes as minimum information only the information about the width and the length of the container. The filling level (in the container with substance) can be determined either by level sensors or by pressure sensors.

In the sense of the present invention, the level value, the pressure value and the density value are determined via a sensor system—e.g. in analog form—and—if necessary—each converted into a digital value (digital level value, digital pressure value, digital density value) for further processing (A/D converter). The digital values mentioned can be temporarily stored in a storage medium, e.g. in a memory unit of the computing unit or the sensor system. Alternatively, the digital values can be provided directly for further processing. The digital values are read in via a corresponding interface and can be processed according to the method according to the invention.

Furthermore, for the purposes of the present invention, the measuring time interval is to be understood as the period of time in which a certain amount of substance is delivered by the dosing pump. Preferably, the measuring time interval is configurable. For example, a measurement time interval can provide temporal information on how much substance has been consumed per time interval. In particular, the consumed amount per time changes depending on the washing program selected by a user, since different amounts of the substance may be necessary for each washing program.

Alternatively or cumulatively, the ACTUAL delivered volume determined in step d) can be determined at least immediately before the start and immediately after the end of a washing program to determine a consumption of the delivered substance caused by the washing program. Cumulatively or alternatively, vehicle-related data may be collected to calculate a consumption of the substance per vehicle-related date. The vehicle-related data is selected from the group consisting of: Vehicle Size, Degree of Soiling, and Wash Time.

The adjustment means can be, for example, a mechanical adjustment means on the dosing pump, such as a rotary wheel. Alternatively, the setting means can also be formed on a human-machine interface (HMI). The setting means is used to set or preset the TARGET delivery volume.

In an advantageous further development of the invention, it is possible to read in a geometric three-dimensional model of the container that defines an area of the container over the height. For each height, different sized areas can be defined so that a volume of the container can be provided as a function of height. This has the advantage that any container shapes can be used, for example having concave or convex outer contours in a side view. In this embodiment of the invention, it is not necessary for the container data record to include a height value for the container. However, recording the height value may optionally be used to verify the calculations.

In another advantageous further development of the invention, the reading of the digital density value for the substance to be delivered with the dosing pump can be carried out via the reading of a code and/or data record. The code is preferably configured as a digital code and can, for example, be a one-dimensional code (e.g. barcode), a two-dimensional code (e.g. QR code) or as a multi-dimensional code, e.g. in the form of a transponder label. The code can be placed on the container, for example, and read via a reading means (code scanner). The data record can be read in via an interface (e.g. in the simplest form on a user interface). The code and/or the data record encode the density value of the substance to be delivered.

Alternatively or cumulatively, in another advantageous further embodiment of the invention, it can be provided that the reading in of the digital density value for the substance to be delivered with the dosing pump is performed by an internal calculation.

The possibility of not estimating the density of the substance to be delivered—if it cannot be provided (e.g. by reading in via a transponder label)—has proven to be advantageous, since this results in not inconsiderable consequential errors. Thus, it may be intended to determine the density by calculation. This is done by referencing the measured level (level sensor) with another sensor. In the simplest case, a lance can be provided via which compressed air can be applied and at least one float (as a further sensor) which outputs the level as a reference at the time of the compressed air application or pressure measurement.

Alternatively or cumulatively, the density value is therefore not directly sensed or read in via a code, but calculated or determined from other data by means of a software routine.

The software routine can be implemented on a computing unit, so that in this case the fourth interface is an internal interface (to the computing unit). The software routine is configured to determine the density by calculation using the detected pressure value and the detected level for a reference point and a reference value of a further sensor, e.g. a temperature sensor, an ultrasonic sensor, a simple float, a tuning fork sensor or a vibration probe and/or a sensor for detecting the counterpressure (in relation to the system into which delivering is to take place and quasi against which delivering is taking place, e.g. into the delivering line or into the working unit). The vibration probe can be a level limit switch, which is damped differently depending on the level and for which the frequency changes. For referencing, in particular, at least one additional sensor (e.g. level above pressure sensor) can be configured as a further sensor for data acquisition. It is then possible, on the basis of the correlation for the hydrostatic pressure $$p(h)=\rho*g*h+p_0$$

when the switching point of the level sensor is reached, which must have a known differential height h to the measuring point of the pressure, the density of the fluid is calculated. For individual measuring points, the pressure sensor used is ideally a differential pressure sensor that measures the overpressure against atmosphere in order to exclude barometric air pressure fluctuations from the calculation. Alternatively, absolute measuring sensors can be used, which are digitally calibrated with a sensor that also measures absolutely and determines the current air pressure. It results thus $$\rho = \frac{p}{g*h}$$

at the reference point. The density is calibrated each time the reference level is reached and stored at the current temperature or at the current value of the other sensor (e.g. back-pressure sensor, ultrasonic sensor value, etc.).

Alternatively or cumulatively, it can be provided that the method according to the invention comprises a method step of detecting a TARGET delivery volume or delivery volume flow (delivery volume per time unit) set at the dosing pump. The TARGET delivery volume or delivery volume flow can be varied via the setting means. Furthermore, the TARGET delivery volume or delivery volume flow from the adjustment of the adjustment means can be detected via a suitable sensor system (e.g. optical sensors for detecting the position of the adjustment means). Furthermore, the current value of the adjustment means and thus of the TARGET delivery volume or delivery volume flow can be detected by the adjustment means and provided in a digital manner. Cumulatively or alternatively, the SET conveying volume or conveying volume flow can be detected via the man-machine interface.

According to a further aspect, the invention relates to an automatic calibration of a mechanical (in particular pneumatic) dosing pump. For this purpose, the method for determining the ACTUAL delivery volume, as described above, is used to match the ACTUAL delivery volume determined in this way with a detected TARGET delivery volume in order to generate calibration signals. The TARGET flow rate can be recorded and/or set per unit of time (i.e. as a TARGET flow rate) which is compared accordingly with an ACTUAL flow rate in the same unit of time.

Cumulatively or alternatively, it can thus be provided that calibration signals (e.g. in digital form for controlling the dosing pump) are provided. The calibration signals are used for automatic calibration of the dosing pump on the basis of the calculated calibration. If the adjustment, i.e. the deviation between the TARGET and ACTUAL delivery volume is linear, an offset can be calculated from the difference between the detected set TARGET delivery volume and the determined ACTUAL delivery volume. In particular, the calibration of the dosing pump can be performed using the offset and/or, in particular, by applying the offset to the setting means. The deviation between the TARGET and ACTUAL delivery volume can be calculated in more complex cases (non-linear behavior of the deviation) by a microcontroller or by an electronic circuit.

Alternatively or cumulatively, it may be provided that the ACTUAL delivery volume determined in step d) is compared with the set TARGET delivery volume for compliance and a calibration indicator is automatically calculated to output a calibration requirement signal if the calculated calibration indicator exceeds a preconfigurable threshold and/or to initiate a troubleshooting action. This serves to automatically and proactively indicate that calibration (possibly re-calibration) is required. The threshold value can be configured in a configuration phase. Advantageously, this allows the process and/or dosing system to be adapted very flexibly to the current conditions.

Alternatively or cumulatively, it can be provided that control signals for controlling the dosing pump are calculated. The calculation of the control signals is based on the actual delivery volume determined in process step d) and optionally an environment parameter data set.

The environment parameter data set is an electronic data set and comprises a set of environmental parameters as technical parameters of an environment of the dosing pump and/or an environment of a feed system or target system into which the substance is to be delivered (pipe system and/or working unit). An environmental parameter may include, for example, the air temperature of the environment in which the container is stored and/or the temperature in the container. Alternatively or cumulatively, an environmental parameter may represent the temperature of the substance in the dosing pump and/or in the container and/or a back pressure in the system. The back pressure represents a resistance in the system that is a result of the viscosity of the substance, and thus may be different for each substance and/or for different temperatures. Alternatively or cumulatively, the environmental parameter may include a time-varying condition of the vehicle (e.g., degree of contamination and/or surface moisture on the vehicle surface) and/or a time-stable (time-constant) parameter related to the vehicle (e.g., size). Using the environmental parameter data set, temperature compensation can thus be performed, for example. This is necessary if, for example, a change in the viscosity of the substance is expected or occurs. Alternatively or cumulatively, the dosing rate can be adapted to the detected degree of contamination of the vehicle. The possibility of measuring the actual consumption of the substance delivered by the dosing pump per vehicle wash (i.e. per wash of a vehicle with a specific wash program) means that the wash program-specific consumption can be priced in.

The recording of the washing program-specific consumption is possible by reading in a characteristic value which uniquely identifies the respective washing program for the vehicle to be washed or washed in each case. Alternatively or cumulatively, a parameter from the environmental parameter data set, in particular the degree of soiling and/or other vehicle-related data, such as the size of the vehicle, the contour deviations from the standard model (e.g. superstructures/add-ons or attachments to the body) can be used in addition to the characteristic value in order to set the consumption of the delivered substance in relation to vehicle-related data (size and/or degree of soiling).

Alternatively or cumulatively, a residual volume of the substance remaining in the container can be determined. This can be determined by calculating the difference between a read-in maximum filling volume value of the container and the ACTUAL delivery volume determined in process step d). In an advantageous manner, the substance consumed per wash and/or time interval can be concluded here. Thus, an imminent refill requirement can be better and proactively indicated and triggered.

Alternatively or cumulatively, it can be provided that the determination of the ACTUAL delivery volume according to method step d) is carried out using a first function and the container is provided with a (filling) level sensor system. The first function determines the ACTUAL delivery volume as a function of the difference between each two detected fill levels or a detected fill level difference (between two points in time), a length and a width of the container as follows:

$$\text{is-}fv = fs \times L \times B. \qquad \text{Function 1}$$

The variable $fs$ denotes a level difference as the difference between two measured levels at two specific times. The variable $fs1$ denotes the level at a first time $t1$ and $fs2$ the level at a second time $t2$. The level difference is calculated with: $fs=fs1-fs2$. However, the level measurement is not limited to measurement at only two points in time, but can also be continuous. In the latter case, a delivery volume flow (progression over time) is calculated. The length of the container is indicated by the variable L variable. The variable Br denotes the width of the container. The filling quantity of the substance in the container can be determined via the level sensor (also: filling level sensor).

In this embodiment of the invention, the container data record and the digital level value are used as necessary input variables for calculating the ACTUAL delivery volume. This embodiment of the invention relates to process steps a) and b) of the method.

According to a further alternative embodiment, it is provided that the determination of the ACTUAL delivery volume according to method step d) is carried out using a second function and the container is provided with at least one analog pressure sensor. The second function determines the ACTUAL delivery volume from a height (or a height difference value), a length and a width of the container as follows:

$$\text{is-}fv = h \times L \times Br. \qquad \text{Function 2}$$

The variable h denotes a fill level difference between two times $t1$, $t2$. "h1" denotes a first fill level at a first time and "h2" a second fill level at a second time. The fill level difference is calculated with: $h=h1-h2$.

The filling height for a container according to the invention is given by the formula:

$$h = \frac{p}{\rho \times g}.$$

It is envisaged that the container is configured with a pressure sensor system that can be used or applied both internally and externally to the container. The height is thus not measured or recorded in this variant, but calculated from pressure, density and acceleration due to gravity.

The variable L denotes the length and the variable Br the width of the container, which can be determined from the container data record. Furthermore, the variable p denotes the measured pressure and the variable $\rho$ the density of the substance and the variable g the acceleration due to gravity.

In this embodiment of the invention, the container data record and in particular only the length and the width of the container and the pressure prevailing in the container at the container bottom and the density of the substance in the container are used as necessary input variables for the calculation of the ACTUAL delivery volume. In this embodiment it is not necessary, but nevertheless possible (e.g. for the purpose of verification of the calculated values), to attach a level sensor to the container or to provide the container with a level sensor. This embodiment of the invention relates to process steps a) and c) of the method.

Process steps b) and c) are therefore alternatives, but they can be combined. It is also possible for process steps b) and c) to be carried out cumulatively. This has two advantages: First, if the density value cannot be read (e.g., from a digital code, e.g., QR code or generally a 1-dimensional (e.g., barcode), 2-dimensional or more code that may be attached to the container), it can be referenced to the level value to determine the density indirectly. On the other hand, the first calculation alternative can be validated with the second calculation alternative and vice versa.

Preferably, process steps a) and d) are always carried out.

Alternatively or cumulatively, it can be provided that the control signals control the clock frequency of a reciprocating piston of the dosing pump. In an advantageous manner, mechanical tolerances of the dosing pump can be compensated. If, for example, the ACTUAL delivery volume deviates from the TARGET delivery volume, the actual output can be adjusted to the set output by increasing the cycle frequency. If this is determined for several setting values of the dosing pump, a pump-specific dosing compensation can be provided. Furthermore, adjusting the cycle frequency can compensate for a temperature-related change in delivery.

Alternatively or cumulatively, it can be provided that the control signals control the TARGET delivery volume. The control signals provided can be used to specify/set a target delivery volume to be achieved. Alternatively, the target delivery volume can be controlled in a closed control loop on the basis of a calculated comparison between the target delivery volume and the actual delivery volume.

Alternatively or cumulatively, it can be provided that during the reading of the digital pressure value in process step c) the pressure in the container is measured using an internal measuring method. Advantageously, at least one pressure sensor arranged in the container is used in the internal measurement process. Pressure sensors known in the prior art and/or methods for determining the pressure can be used for this purpose.

According to an alternative or supplementary advantageous embodiment, it is provided that when the digital pressure value is read in process step c), the pressure in the container is measured using an external measuring method. In the external measuring method, no pressure sensor needs be arranged in the container. In an advantageous way, the external measurement is based on a hydrostatic pressure measurement using a lance for applying compressed air. The compressed air is introduced into the container, in particular in the area of the container bottom via the lance. The lance represents a downward open space (open volume). The introduced air fills the space against the hydrostatic pressure of the liquid until the air exits into the liquid at the lower boundary surface of the space. The resulting air pressure in the space corresponds to the liquid pressure and can be measured outside the liquid with a pressure sensor. The process is also referred to as the bubbling-in process ("Einperlverfahren") and is known in itself and therefore requires no further explanation.

According to a further alternative or supplementary advantageous embodiment, it is provided that the dosing pump is operated for a container that is exchangeable. In an advantageous manner, the present invention ensures that different containers can be used variably in combination with the dosing pump. The operator of the vehicle washing system is no longer bound to a predetermined type of container with a fixed volume, but can operate his vehicle washing system with substances from different containers and thus from different suppliers. This enables more efficient and at the same time more flexible operation of the vehicle wash system.

According to a further alternative or supplementary advantageous embodiment, it is provided that the dosing pump is operated for a container that can be refilled. In an advantageous manner, the supply of substance to the vehicle washing system can be carried out more sustainably and without a high consumption of containers.

According to a further alternative or supplementary advantageous embodiment, it is provided that during the reading of the container data record in method step a) at least the reading of a length value and width value for the container with a rectangular base area and optionally a height value is performed. Alternatively or cumulatively, it is provided that during the reading of the container data record in method step a) at least the reading of a radius value and height value for the container with a round base surface takes place. Advantageously, the container can have different shapes. The information contained in the container data record can be used to determine the volume of the container.

According to a further alternative or supplementary advantageous embodiment, it is thus provided that the dosing pump is operated for a container which can have a variable size. In an advantageous manner, the dosing pump can be operated with different volumes for one of the different substances in each case. Thus, the container size can be selected depending on the expected demand for a specific substance.

According to a further alternative or supplementary advantageous embodiment, it is provided that the container is a storage container with a closable refill opening. In an advantageous manner, used substance can be refilled via the closable refill opening. Via the closable refill opening, the introduction of foreign particles can be prevented when the refill opening is closed.

Furthermore, it may be provided that the reservoir is in fluid-mechanical connection to a mixer and/or to at least one working unit of the vehicle washing system. A mixer is to be understood as an assembly of the vehicle washing system in which a substance can be mixed with another substance (e.g. water) or another chemical. The mixer is used to provide a mixture of at least two substances having a specific characteristic to achieve an expected cleaning result in a specific wash program and/or wash process. In a simple embodiment, the mixer may be a fluid mechanical connection element, such as a hose. The fluid-mechanical connection enables fluid transport from the container via the dosing pump to the mixer and/or the working units. The fluid mechanical connection may include, for example, hose connections and/or pipe connections. The working units/aggregates are understood to be the aggregates of the vehicle washing system that perform a cleaning action in a direct manner.

Cumulatively or alternatively, it can be provided that the container is a calibration container which is at least temporarily fluid-mechanically connected to the dosing pump and which has a significantly smaller size than a storage container from which the substance is to be delivered by means of the dosing pump for the purpose of vehicle washing. Here, the term "temporarily" describes a temporal section that does not have to be of long duration, but is predetermined. By way of example, temporarily may comprise the temporal section in which the calibration container with a predetermined and known substance is in fluid-mechanical connection with the dosing pump for calibration. In an advantageous manner, the dosing pump and/or the vehicle washing system can thus be calibrated using a known and predetermined amount of the substance.

Cumulatively or alternatively, it is possible to compare the actual delivery volume determined in step d) with a setpoint value and to automatically calculate an error indicator in the event of deviations. Advantageously, a warning signal can be output if the calculated error indicator exceeds a preconfigurable threshold value. The warning signal may comprise an acoustic, visual or audio-visual warning signal and/or a vibration warning signal. To this end, the dosing system comprises a visual and/or audio signal generator and/or a vibration signal generator, which may be provided on an electronic terminal device (e.g., smartdevice, such as Hany, with a control application on which the method is implemented). Alternatively or cumulatively, the signal generator may also be provided on a user interface. The warning signal can thus also be provided via the man-machine interface. Further advantageously, a troubleshooting action can be initiated if the calculated error indicator exceeds a preconfigurable threshold. Thus, a diagnosis of the deviation can be performed and based on the diagnosis a correction of the identified error can be performed.

Preferably, the reading-in in step a) takes place only once for several, in particular all, determinations of the ACTUAL delivery volume in step d) for the respective container. However, the read-in steps b) and c) are preferably performed several times and in particular continuously.

Cumulatively or alternatively, it is possible to determine the actual delivery volume in step d) at at least two measurement times. In particular, by using at least two measuring times, a temporal development can be mapped and necessary information about the ACTUAL conveying volumes at the measuring times can be derived from this. In particular, a first measuring time point and a last measuring time point can define a measuring time interval that corresponds to the duration of a wash or a wash program. For example, the measurement time points may be immediately before the start and after the end of at least one vehicle wash, so that a difference calculation representing a volume difference between the two measurement time points is applied to the respectively determined ACTUAL deliver volumes, each of which is assigned to a measurement time point. Thus, the difference calculation can represent an ACTUAL delivery volume per completely or fully executed vehicle wash. Alternatively, it is possible to measure several times selectively or continuously during at least one vehicle wash in order to minimize the number of possible measurement errors due to outliers in the measurement.

Cumulatively or alternatively, it may be provided that the measurement time interval is selected to be shorter and correlate with a wash program section of a complete wash program. A wash program section is a section in the complete wash program that can be combined with other wash program sections together to form a complete wash program. A wash program section is executed by functional blocks using working units of the washing system. A wash program section may be, for example, a rim wash, an underbody wash, a waxing operation, a polish application, a drying operation. The washing program sections can be selected individually and separately (e.g. on a user interface). In this further development, it is now advantageously possible to calculate the determined ACTUAL delivery/feed volume per wash program section. This enables a more targeted and specific analysis of the consumption per wash program section.

Cumulatively or alternatively, it can be provided that in addition to determining the ACTUAL delivery volume, a number of strokes performed with the dosing pump is recorded and stored. The number of strokes of the dosing pump can be defined as the number of strokes. Furthermore, it can be provided that the determined ACTUAL delivery volume per stroke is determined or calculated. Advantageously, the evaluation of the number of strokes can be used to check the actual function of the dosing pump. If, in addition, the number of strokes of the dosing pump piston is measured over a longer period of time with a vehicle washing system that is functioning correctly according to the specification, an increasingly accurate value for the set stroke volume can be determined. This stroke volume can subsequently be used for an exact calculation of an individual consumption of a vehicle wash. As soon as the value is available (slight change in the moving average), the vehicle washes performed up to that point can be recalculated and future vehicle washes can be directly evaluated. On the other hand, it is possible to predict how fast the fill level will change in the future and, if this does not happen as predicted, to issue an error message via man-machine interface. From the error message, the performance of a functional test of the system can be derived.

The container data record can be read in once in step a). This has the advantage of avoiding unnecessary data acquisition. The container data record can be read in once for each container. Alternatively or cumulatively, the fill level measured in step b) and/or the pressure measured in step c) and the density value read in step c) can preferably be measured and/or read in at a configurable measuring time interval. In an advantageous further development of the invention, the number of strokes, as described above, is also recorded in the configurable measurement time interval. This has the advantage that a stroke volume (ACTUAL delivery volume per stroke) can be determined. By multiplying the known number of executed strokes by the determined stroke volume, the volume actually delivered in the measuring time interval (e.g. per executed wash program) can be determined.

Cumulatively or alternatively, it can be provided that an actual washing program-specific consumption per vehicle wash is calculated from the ACTUAL delivery volume determined in process step d) and a read-in characteristic value for identifying the washing program executed for the vehicle wash. This consumption can be compared with an expected consumption for the vehicle wash in order to initiate corrective measures if deviations are present.

According to a further embodiment, it is provided that an application concentration of the substance delivered by the dosing pump into a mixer is determined from the determined ACTUAL delivery volume, the mixer being configured for mixing substances. The mixer can be configured for mixing substances that are delivered by one or more (different) dosing pumps.

Cumulatively or alternatively, it can be provided that the ACTUAL delivery volume determined in process step d) is stored in an assigned manner with a characteristic value for identifying a respectively executed washing program of the vehicle wash. The characteristic value advantageously indicates the substances used in the vehicle wash and/or the duration of the vehicle wash. The characteristic value can be configured as a feature to be used only once, which is assigned to a type of vehicle wash or parameters of the vehicle wash and uniquely identifies them. The characteristic value is used to code the vehicle wash and in particular the wash program, the substances used in the vehicle wash and/or the duration of the vehicle wash. The identification value can be stored in a memory unit. The identification value can comprise codings known in the state of the art.

Above, the solution of the object was described on the basis of the computer-implemented method according to the first aspect of the invention. Features, advantages or alternative embodiments mentioned therein are equally transferable to the other claimed objects or aspects of the invention, and vice versa. In other words, the subject matter of the apparauts claims (directed, for example, to a computing unit, system or computer program) may also be further formed with the features described or claimed in connection with the method and vice versa. The same applies vice versa, so that features implemented by a computing unit, a system or directed to a computer program may be/be implemented in a method step and be part of the computer-implemented method. The corresponding functional features of the method are thereby formed by corresponding tangible modules, in particular by hardware modules or microprocessor modules, of the system or the product and vice versa. The preferred embodiments of the invention described above in connection with the method are not explicitly repeated for the apparatus. In general, in computer science, a software implementation and a corresponding hardware implementation (e.g., as an embedded system) are equivalent. For example, a method step for "reading in" data may be implemented with a read-in interface and corresponding instructions for reading in data. Therefore, to avoid redundancy, the apparatus is not explicitly described again, although it may also be used in the alternative embodiments described with respect to the method.

In a further aspect, the present invention relates to a computing unit for determining an ACTUAL delivery volume for a dosing pump. The computing unit may be intended for carrying out the method described above. The dosing pump is intended for delivering a substance from a container. Further, the dosing pump is provided with an adjustment means for manually adjusting a TARGET delivery volume and is intended for use in a vehicle washing system. The computing unit comprises a first read-in interface. The first read-in interface is configured to read in a container data record for the container from which the substance is to be delivered by means of the dosing pump. Furthermore, the computing unit comprises a second read-in interface. The second read-in interface is configured to read in a digital fill level value. The digital level value represents a level difference measured in the container by means of at least one analog (filling) level sensor. Alternatively or cumulatively to the second read-in interface, the computing unit has a third read-in interface. The third read-in interface is configured to read in a digital pressure value. The digital pressure value represents a pressure difference measured in the container by means of at least one analog pressure sensor. Furthermore, (e.g. optionally) a separate fourth read-in interface is configured for reading in a density value for the substance to be delivered with the dosing pump. Furthermore, the computing unit is configured to determine an ACTUAL delivery volume. In this case, the delivery volume actually delivered by the dosing pump in a measurement time interval is determined. The actual delivery volume can be determined by applying a first function (f1) to the read-in digital level value and the read-in container data record. Cumulatively or alternatively, the actual delivery volume can be determined by applying a second function (f2) to the pressure value read in and the density value read in and the container data record read in. In addition, the computing unit further comprises an output interface. The output interface is intended for outputting the determined ACTUAL conveying volume. The output interface can be in data connection with a calibration unit in order to calibrate the dosing pump on the basis of the determined ACTUAL delivery volume and to generate calibration signals.

The read-in interfaces are configured to provide a connection to a corresponding medium and/or a corresponding technical unit in order to read in the digital data and provide it to the computing unit for further processing. The read-in interfaces can include a converter for converting an analog signal into a digital signal and vice versa.

In a further aspect, the present invention relates to a dosing system for a vehicle washing system comprising a dosing pump and a computing unit according to the further aspect of the invention. Further, the dosing system comprises a container preferably for intake/holding the substance.

According to one embodiment of the dosing system, it is provided that the dosing system and in particular the computer unit is configured or provided with a man-machine interface. In an advantageous manner, the man-machine interface enables interaction between the operator and the computer unit or the vehicle washing system. Furthermore, the man-machine interface may enable, beyond the actual operation of the computing unit or the vehicle washing system, the observation of the states of a washing process and an intervention in the process of the washing process. A provision of the states of the vehicle washing system may be visual and/or audible or audio-visual. For example, the man-machine interface can be configured as a terminal (control panel) with signal lamps, display fields, pushbuttons and/or switches. Alternatively, a terminal can be provided in which the aforementioned elements can be displayed and selected by software via a visualization system. This can be implemented, for example, via a screen with input devices (mouse, keyboard) or via a touchscreen.

The dosing system may include a signal generator. The signal generator may include a visual and/or audible signal generator and/or a vibration signal generator. The signal generator can be used to indicate an upcoming calibration in order to proactively indicate deviations between the SET and ACTUAL delivery volumes if a configurable threshold value is exceeded or undershot.

In another aspect, the invention relates to a vehicle washing system comprising a dosing system as described above.

In another aspect, the present invention relates to a computer program. The computer program is loadable into a memory unit of a computing unit. The computer program includes program code portions for causing the computing unit to execute the method for determining an ACTUAL delivery volume according to any one of the method claims when the computer program is executed in the computing unit according to an aspect of the invention.

BRIEF DESCRIPTION OF THE FIGURES

In the following detailed figure description, embodiments which are not to be understood restrictively are discussed with their features and further advantages on the basis of the drawing. In this show.

Figure 1:
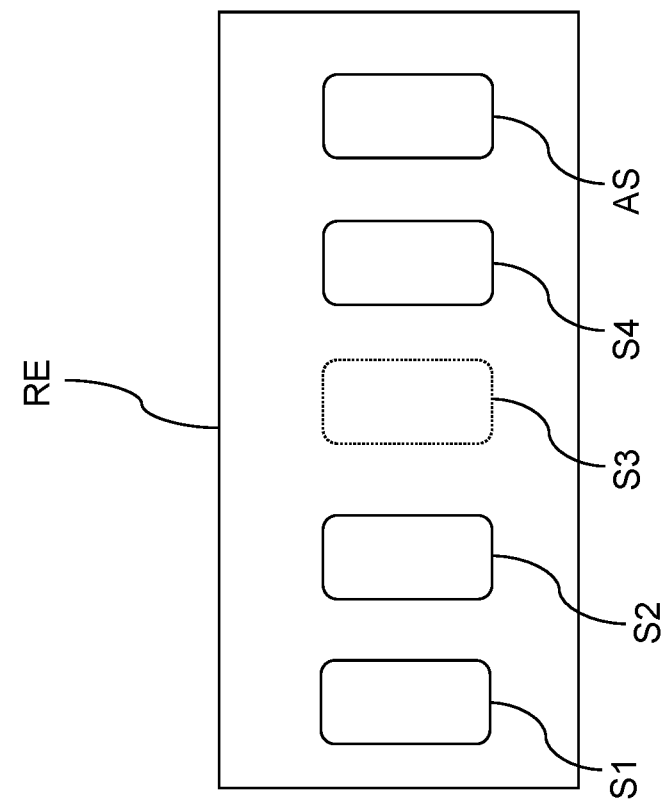
FIG. 1 a schematic representation of a computing unit according to one embodiment of the invention.

The accompanying drawings are intended to provide a further understanding of embodiments of the invention. They illustrate embodiments and, in connection with the description, serve to explain principles and concepts of the invention. Other embodiments and many of the advantages mentioned will be apparent in view of the drawings. The elements of the drawings are not necessarily shown to scale with respect to each other.

In the figures of the drawing, identical elements, features and components with the same function and the same effect are to be given the same reference signs in each case, unless otherwise specified.

DETAILED DESCRIPTION OF THE INVENTION

FIG. 1 shows a schematic representation of a computing unit according to one embodiment of the invention. In FIG. 1, reference sign RE denotes an embodiment of the computing unit according to the invention. The embodiment of the computing unit RE shown with FIG. 1 is intended for determining an ACTUAL delivery volume is-fv for a dosing pump DP. By means of the dosing pump DP, a substance can be delivered from a container B. The substance comprises agents for cleaning a vehicle, in particular chemical cleaning substances for use in a washing system WA (cf. FIG. 4). The dosing pump DP further comprises an adjustment means. The adjustment means is used for manual setting of a TARGET delivery volume. The dosing pump DP (cf. FIG. 4) can be intended for use in a vehicle washing system WA.

The computing unit RE has a first read-in interface S1. The first read-in interface S1 is configured to read in a container data record bds for the container B (cf. FIGS. 4 and 5). The substance contained in the container B can be delivered from the container B by means of the dosing pump DP. Furthermore, the computing unit RE has a second read-in interface S2 for reading in a digital filling level value fs. The level value fs represents a level measured in the container B by means of at least one analog (filling) level sensor FSS (also: in short level sensor) or a level difference between different points in time. Alternatively or cumulatively to the second read-in interface S2, the computing unit RE has a third read-in interface S3. A digital pressure value p (cf. FIG. 5) can be read in by means of the third read-in interface S3. The digital pressure value p represents a pressure measured in the container B by means of at least one analog pressure sensor DS or a pressure difference between different points in time. It may be provided to read in a density value p for the substance to be delivered by the dosing pump DP. This can be done via a fourth read-in interface S4. Alternatively or cumulatively, the density value can also be read in via the third read-in interface S3. In this case, however, the third read-in interface S3 must have a bus connection. An RFID reader or a QR scanner and a pressure sensor can be connected via the bus connection or bus interface. Since this is an optional embodiment, it is shown in dotted lines in FIGS. 1 and 5.

Figure 5:
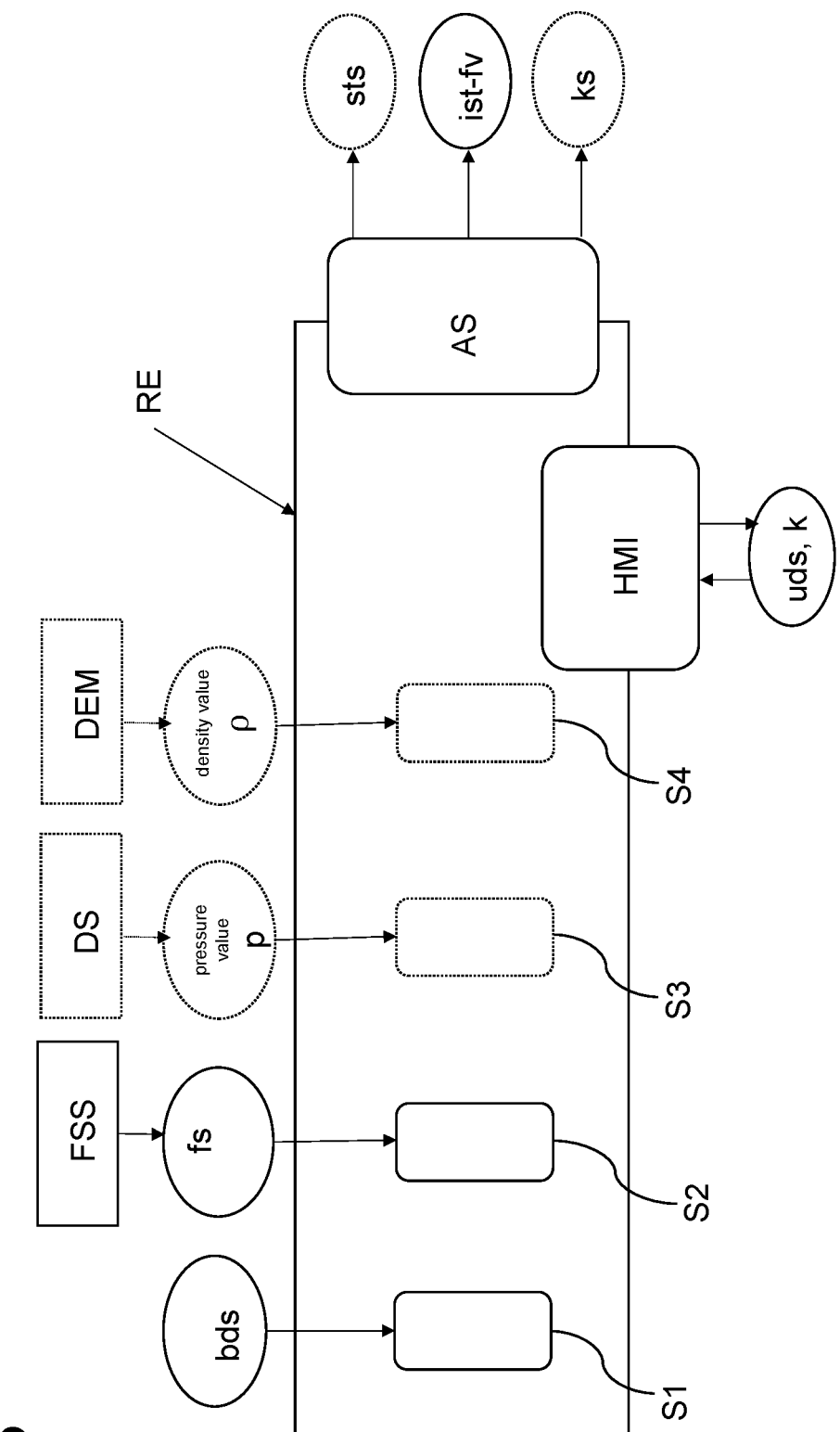
FIG. 5 a schematic representation of a computing unit according to a further embodiment of the invention.

The RE calculation unit is configured to determine an ACTUAL delivery volume ist-fv (see FIG. 5). The ACTUAL delivery volume is-fv indicates the delivery volume actually delivered by the dosing pump DP in a measuring time interval. In a first embodiment of the invention, the ACTUAL delivery volume is determined on the basis of the digital level value fs and on the basis of the read-in container data record bds (steps a) and b) of the method).

In a second embodiment of the invention, the ACTUAL delivery volume is determined on the basis of the digital pressure value p and the read-in density value p and on the basis of the read-in container data record bds, in particular the length L and the width Br (steps a) and c) of the method). In the second embodiment of the invention, it is not absolutely necessary (but certainly possible for validation) to attach level sensors to the container and measure a fill level.

The computing unit may be implemented as a stand-alone computer unit. Alternatively, the computing unit may be implemented in software and executed on a digital processor and/or microprocessor. Furthermore, the computing unit may be implemented in a programmable logic controller or alternatively be configured as a programmable logic controller.

Furthermore, the computing unit RE has an output interface AS. The output interface AS is intended for outputting the determined ACTUAL delivery volume is-fv. The output interface can be configured to provide the determined ACTUAL delivery volume for display on an output unit. In a further embodiment, the output interface itself can be configured as an output unit, for example as a monitor or touchscreen.

Figure 2:
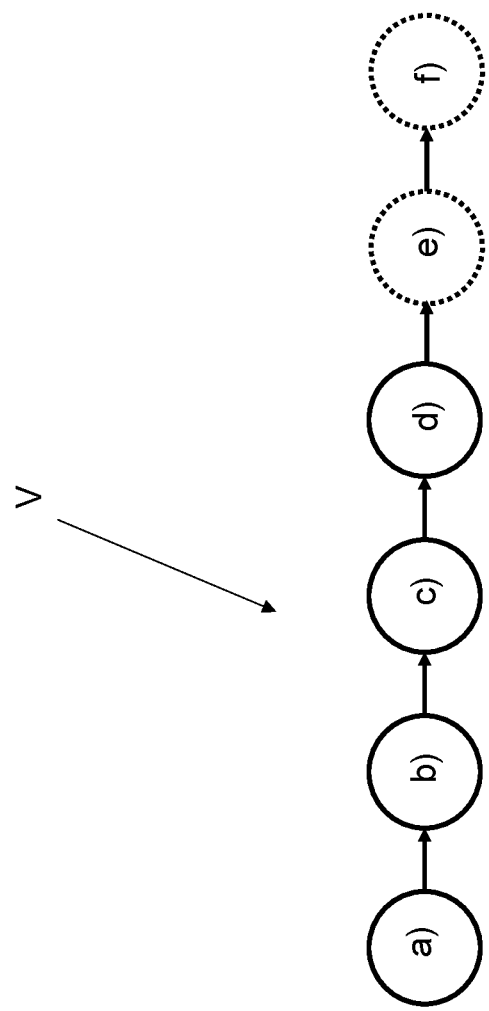
FIG. 2 a flowchart of a process according to one embodiment of the invention.

FIG. 2 shows a flowchart of a computer-implemented method according to one embodiment of the invention. In FIG. 2, the reference sign V denotes an embodiment of the computer-implemented method according to the invention. In the embodiment shown, the computer-implemented method V for determining an ACTUAL delivery volume for a dosing pump DP comprises a plurality of steps. The dosing pump DP is intended for delivering a substance from a container B. Furthermore, the dosing pump DP is provided with a setting means for manually setting a TARGET delivery volume for use in a vehicle washing system WA.

In a first step a), a container data record bds is read in for the container B. The container B contains the substance. This substance is to be delivered from the container B by means of the dosing pump DP. In a further step b), in a first embodiment of the invention, a digital level value fs can be read in. The digital filling level value fs represents a difference between each two fill levels measured in the container B by means of at least one analog filling level sensor FSS, in particular a fill level of the substance in the container B. Alternatively or cumulatively to step b), in a second embodiment of the invention, a digital pressure value p can be read in step c). The digital pressure value p represents a difference between two pressures in the container B measured at different times by means of at least one analog pressure sensor DS. Furthermore, in step c), a digital density value p is read in for the substance to be delivered with the dosing pump DP. In a further step d), the ACTUAL delivery volume ist-fv, which has actually been delivered by the dosing pump DP in a measurement time interval, is determined and output. The determination can be made on the basis of the read-in digital level value fs and on the basis of the read-in container data record bds. Alternatively or cumulatively, the determination can be carried out on the basis of the read-in digital pressure value p and the read-in density value p and on the basis of the read-in container data record bds. The steps of the method according to the invention, in particular steps a) to c) for reading in, can be carried out in different sequences.

Figure 3:
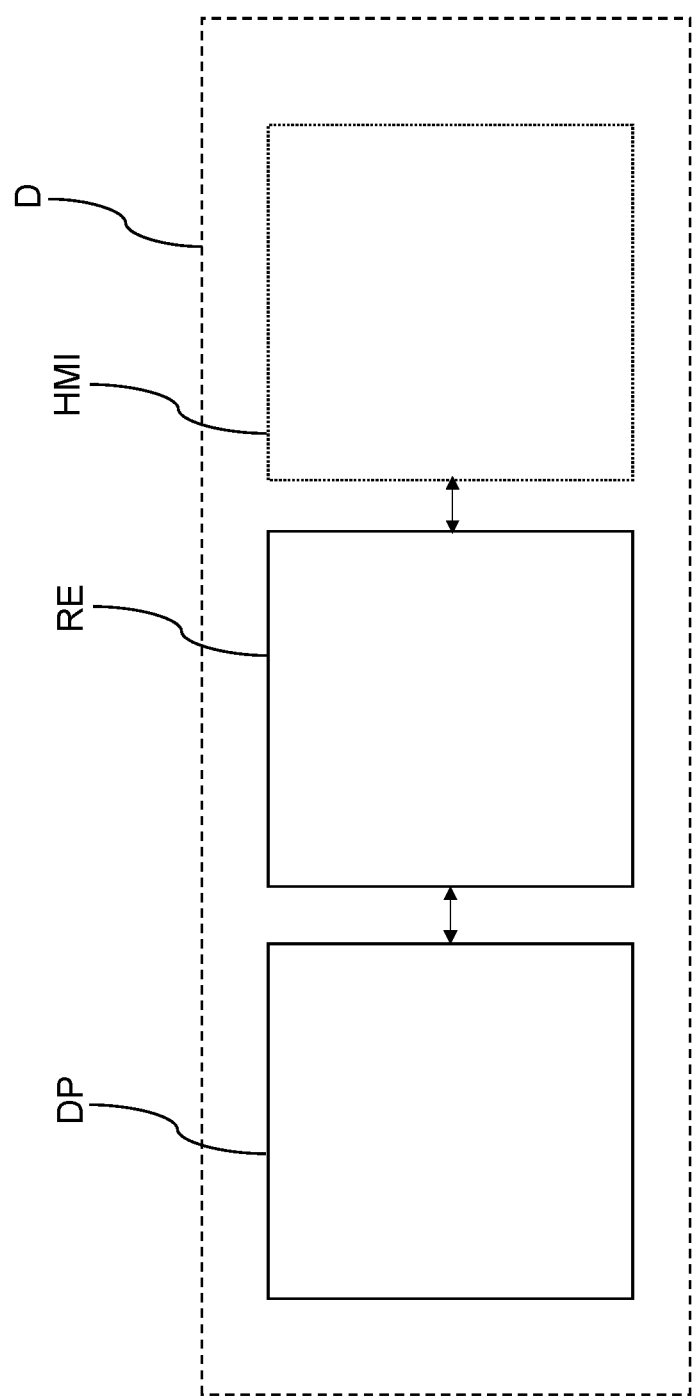
FIG. 3 a schematic representation of a dosing system according to one embodiment of the invention.

The method according to the invention can be executed on the computer unit RE of a dosing system D (cf. FIG. 3). Alternatively, the method according to the invention can be executed on a decentralized computer system which is in communication with the dosing system D or the washing system WA.

In a further embodiment, the method optionally—and therefore shown in dotted lines in FIG. 2 further comprises the detection of a TARGET delivery volume set at the dosing pump DP in step e). Furthermore, in a further embodiment, the method can optionally—and therefore shown dotted in FIG. 2—comprise the provision of calibration signals ks in step f). By means of the calibration signals ks, an automatic calibration of the dosing pump DP can be performed on the basis of a calculated offset or other non-linear deviations. The offset or deviations are calculated by the computing unit RE from the difference between the detected set TARGET delivery volume and the ACTUAL delivery volume is-fv determined in process step d) of the process according to the invention.

Furthermore, it can be optionally provided that the ACTUAL delivery volume ist-fv determined in process step d) is compared with a setpoint value for compliance and, in the event of deviations, an error indicator is automatically calculated to output a warning signal if the calculated error indicator exceeds a preconfigurable threshold value and/or to initiate an error correction measure. The warning signal may be provided and/or output via the output unit AS of the computing unit RE. In this regard, corrective action can be taken by an operator in response to a deviation from a predetermined delivery volume. Thus, a consistent quality of the washing process is ensured.

Furthermore, it can be provided that the measurement in process steps b) or c) is carried out continuously in a measurement period or at at least two measurement times. These measurement times can preferably be set immediately before the start and after the end of at least one washing program of a vehicle wash. Thus, a difference calculation can be applied to the ACTUAL flow rate determined at the measuring time. A resulting difference represents a difference in delivery volume between the selected measurement times. Deviations can be recorded, evaluated and corrected accordingly. This makes it possible, for example, to indicate a washing program-specific consumption.

FIG. 3 shows a schematic representation of a dosing system according to one embodiment of the invention. In FIG. 3, reference sign D denotes an embodiment of the dosing system according to the invention. The dosing system D is configured to provide substances for a washing system WA. The dosing system D comprises a dosing pump DP for providing the substances for the units of the washing system WA. Furthermore, the dosing system D comprises the computing unit RE. According to one embodiment, the computing unit RE may be arranged locally to the washing system WA and/or the dosing system D. In another embodiment, the computing unit RE can be arranged decentralized to the washing system WA and/or the dosing system D and communicate with the washing system WA and/or the dosing system D via a communication system.

Furthermore, the dosing system D may comprise a human-machine interface HMI. This is optional and therefore shown dotted in FIG. 3. The human-machine interface HMI is configured for communication between the operator and the computing unit RE, in particular the washing system WA. The computing unit RE comprises input and/or output means for communication, such as a monitor, touch screen, keyboard and/or cursor movement means.

Figure 4:
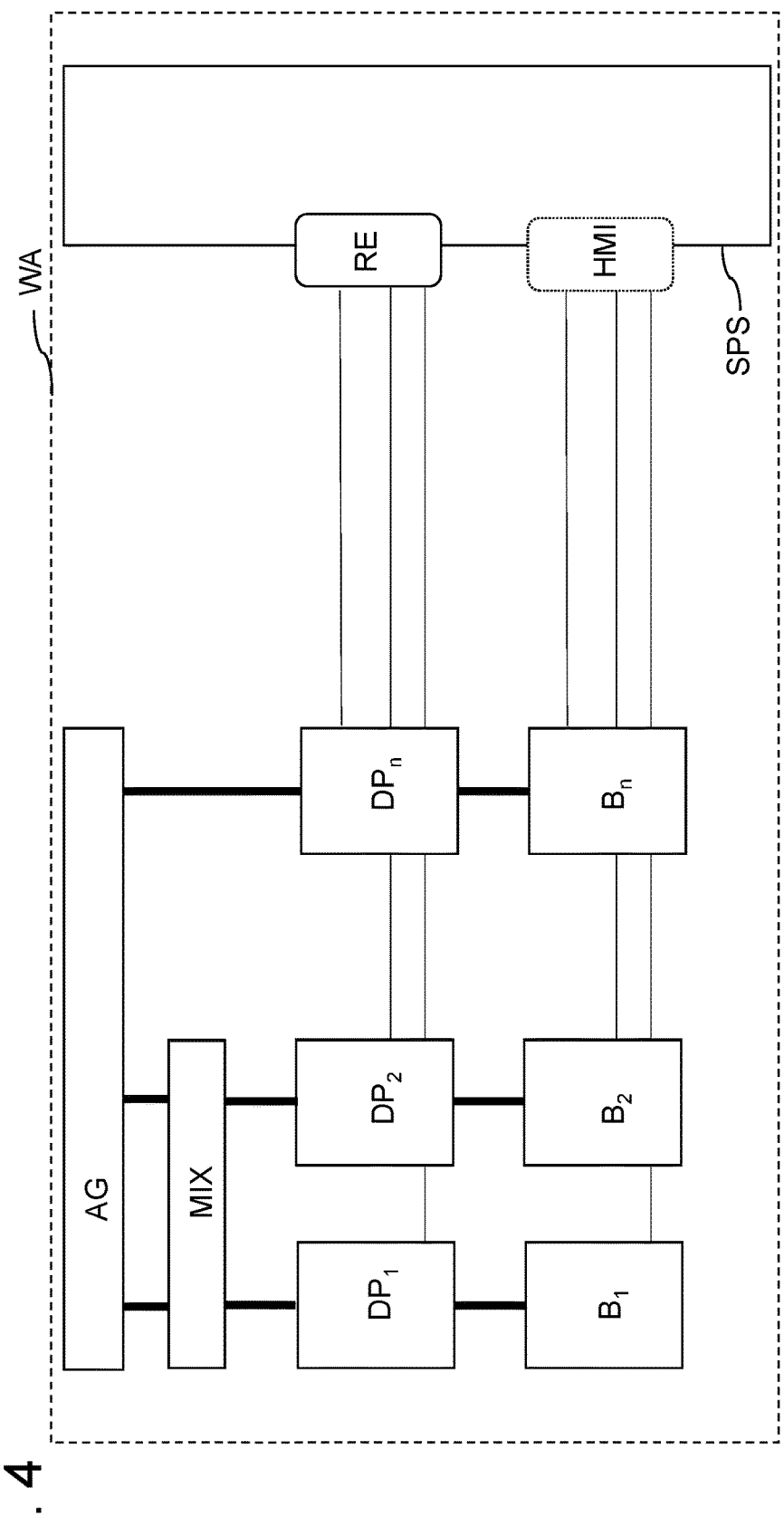
FIG. 4 a schematic representation of a washing system according to one embodiment.

FIG. 4 shows a schematic representation of a washing system according to one embodiment. In FIG. 4, the reference sign WA designates an embodiment of the washing system. The washing system WA comprises at least one container B for holding the substance. A container data record bds is assigned to the container B. At least a length value L and a width value Br for the container B can be taken from the container data record bds. The shape and/or type of the container B can be taken from the container data record. In addition, information about the substance contained in the container B can be taken from the container data record bds. In a further embodiment, the container data record bds comprises a radius value and height value for a container shape having a round base. The washing system WA may comprise a plurality of differently sized and differently shaped containers B, which may contain a specific substance.

Furthermore, the washing system WA comprises at least one dosing pump DP. The DP according to the invention is in fluid-mechanical connection with a container B. The dosing pump DP is configured to deliver the substance from the container B to the working equipment AG of the washing system WA. In the illustrated embodiment of the washing system WA according to FIG. 4, the washing system WA has a plurality of dosing pumps DP. In particular, a dosing pump DP is associated with a container B for transporting the substance. The number of dosing pumps DP and containers B shown in FIG. 4 is not limited to the number shown. Furthermore, depending on the construction of the washing system WA, a different number of containers B and/or dosing pumps DP may be provided. Each of the dosing pumps is in data connection with the computing unit RE. The computing unit RE can also have several instances and be formed locally on or at a dosing pump DP.

In one embodiment of the washing system WA, the dosing pumps DP have a fluid-mechanical connection to a mixer MIX. Alternatively and/or additionally, the dosing pumps have a direct fluid-mechanical connection to the units AG of the washing system WA. The mixer MIX is configured to generate a mixture of different substances from different containers B. The mixture is generated by the mixer MIX according to the selected washing process and supplied to the working units/aggregates AG.

In a first embodiment, the mixer MIX may be formed in the actual delivery system through which the substance is delivered to the aggregates AG of the washing system WA. In this respect, the fluid-mechanical connection between the dosing pump DP and the aggregates AG of the washing system WA may comprise dosing valves (not shown), via which the concentration of the substance is adjusted for the desired mixture. In other words, only the appropriate concentration of a substance is supplied into the delivery system via the dosing valves in order to obtain the desired mixture of substance for a specific application/washing process. Mixing takes place automatically during the actual transport in the conveyor system from the dosing pump DP to the aggregates AG of the washing system WA.

In a further preferred embodiment, the mixer MIX can be configured as a further container B, in which the substance is delivered from the individual containers B via the corresponding dosing pump DP and made available. In this container B, mixing and subsequent provision of the mixture to the aggregates AG of the washing system WA takes place.

According to the illustrated embodiment of FIG. 4, the washing system WA comprises a programmable logic controller PLC. The programmable logic controller PLC may comprise the computing unit RE or be in data communication therewith. Optionally, the user-machine interface HMI may be formed. The programmable logic controller PLC is in communication with the dosing pumps DP and the tanks B of the washing system WA.

The working units (aggregates) AG of the washing system WA may comprise, for example, cleaning brushes and/or nozzles for providing substances, air and/or water. Usually, a container is provided for supplying a substance to the working devices.

FIG. 5 shows a schematic representation of a computing unit according to a further embodiment of the invention. The computing unit RE has the first input interface S1, the second input interface S2 and optionally or cumulatively to the second input interface S2 the third input interface S3 (dotted representation, because optional). The interfaces can be used to read in input data or values for determining the ACTUAL delivery volume ist-fv. The container data record bds for the container B is read in via the first interface S1. In one embodiment, the first interface S1 can be configured as a read-in means. Alternatively, the first interface S1 may be configured as an electronic interface (data interface) to a reading means (e.g. code scanner, such as QR code scanner) or a memory in which the container data record bds is stored. The first interface S1 can also be configured as a user interface on which the container data record bds is captured.

A digital level value fs, which corresponds to a measured level in the container B, is transmitted via the second interface S2. The level is determined by means of at least one analog level sensor FSS and converted into a digital value in the level sensor itself or a corresponding converter unit and read in via the second interface S2. The second interface S2 is electrically connected and in data connection with the level sensor FSS and/or the corresponding converter unit, e.g. an analog-to-digital converter.

Furthermore, a third read-in interface S3 for reading in a digital pressure value p can be provided alternatively or cumulatively to the second read-in interface S2 (again shown dotted in FIG. 5). The pressure in a container B can be determined by means of at least one analog pressure sensor DS. Furthermore, a density value ρ for the substance to be delivered with the dosing pump DP can be read in—preferably on a fourth separate read-in interface S4. The density value can be provided from a density detection means DEM. The density detection means DEM can be configured as a measuring device. Cumulatively or alternatively, the density detection means DEM may also be configured as a software function module that calculates the density from other acquired and/or provided data. The density value can also be read in by accessing the computing unit, in which a software routine is stored, which is configured to determine the density by calculation using the detected pressure value and the detected level and a reference value. In particular, at least one further sensor can be configured for data acquisition for this purpose. Alternatively or cumulatively, the acceleration due to gravity can be used for the calculation.

The output unit AS can be used to provide the determined ACTUAL delivery volume ist-fv. The output unit AS can be configured as a display means, e.g. a monitor or touchscreen, via which the determined ACTUAL delivery volume is output pictorially for an operator of the washing system WA. In addition or alternatively (therefore shown dotted), in one embodiment the control signals sts for controlling the dosing pump DP can be output via the output unit AS. The control signals are calculated from the ACTUAL delivery volume ist-fv determined in process step d) of the process according to the invention. Supplementarily or alternatively, the control signals sts are calculated from the ACTUAL delivery volume ist-fv determined in method step d) of the method according to the invention and an environment parameter data set uds for controlling the dosing pump DP. Alternatively or cumulatively (shown in dotted lines), calibration signals ks can be provided for calibrating the dosing pump DP.

The control signals sts can be monitored and, if necessary, appropriate measures can be taken to correct the control of the dosing pumps DP. Furthermore, it can be provided that in case of deviation from a SET volume flow, a visual or audio-visual message is output via the output unit AS.

Furthermore, it can be provided that a residual volume of the substance remaining in the container B is determined via the computing unit RE by forming the difference between a read-in maximum filling volume value of the container B and the ACTUAL delivery volume ist-fv determined in process step d). Furthermore, it can be provided that the control signals sts control the cycle frequency of a reciprocating piston of the dosing pump DP and/or in which the control signals sts control the target delivery volume.

Figure 6:
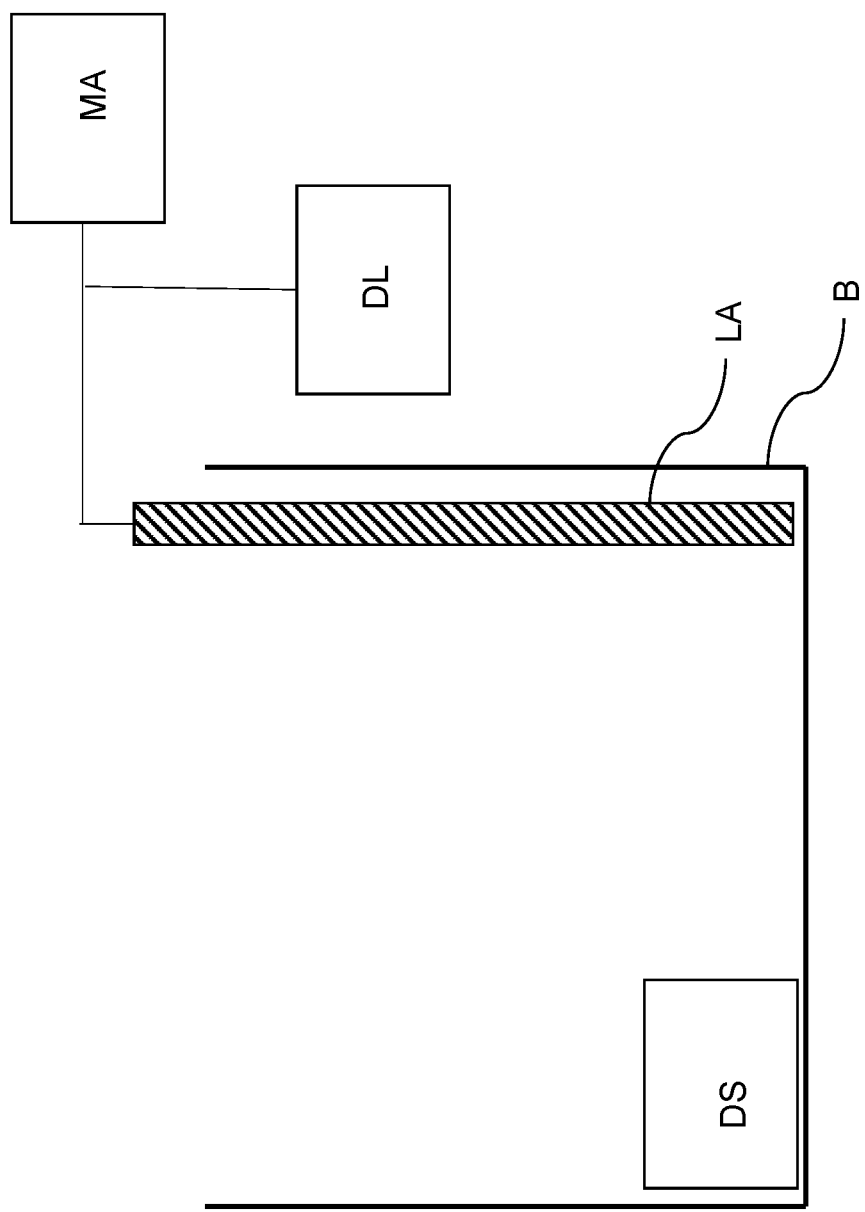
FIG. 6 a schematic representation of a container according to the invention.

FIG. 6 shows a schematic representation of a container, according to the invention. The container B can have different designs. For example, the container B may have an approximately round or a square base. Further, the container may be configured as a replaceable and/or refillable container.

It can be provided that the container has a variable size. In an advantageous manner, the car washing system operator is thus not dependent on one supplier for substances. Rather, substances can be obtained from different suppliers who can supply them in different shapes and designs of containers B. This is made possible because the method according to the invention determines the actual volume flow of the dosing pump or takes into account the specific design of the container B, irrespective of the container shape and/or irrespective of the sensor system (level sensor system or pressure sensor system) on the container.

In a further embodiment, the container B may be configured as a storage container with a closable refill opening. Substrate stored in the container can be replenished as required via the closable refill opening. Furthermore, the container B is in fluid-mechanical connection with a mixer Mix and/or with at least one working unit AG of the vehicle washing system WA. Via the fluid-mechanical connection (delivery system), the substance is provided by means of the dosing pump DP.

It is further provided that the pressure in the container B is measured using an internal measuring method. At least one pressure sensor DS can be arranged in the container B for this purpose. Pressure sensors are known in the prior art. The pressure sensor DS can provide an analog signal corresponding to the pressure in the container B. The analog signal may be converted into a digital signal via a converter unit, for example an AD converter, and provided to the computing unit RE. Alternatively, the pressure sensor DS itself may comprise the conversion unit and provide a digital signal for further processing.

In a further embodiment, the pressure in the container B can be determined in an external measurement procedure. The external measuring method is carried out using a hydrostatic pressure measurement. In the hydrostatic pressure measurement, compressed air DL is applied to the container B using a lance LA. In particular, the compressed air DL is applied in the area of the container bottom of the container B. The pressure with which the air exits through the substance in the container B can be evaluated via a measuring display with measuring transducer MA and provides information about the pressure present in the container B.

Finally, it should be noted that the description of the invention and the embodiments are in principle not to be understood restrictively with respect to any particular physical realization of the invention. All of the features explained and shown in connection with individual embodiments of the invention may be provided in different combinations in the subject matter of the invention in order to simultaneously realize their advantageous effects.

The scope of protection of the present invention is given by the claims and is not limited by the features explained in the description or shown in the figures.

For a person skilled in the art it is in particular obvious that the invention can be applied not only to containers with a certain sensor technology (e.g. level gauge), but also to containers which exhibit a different sensor technology (e.g. pressure measurement). Furthermore, the components of the computing unit may be implemented distributed on several physical products. For example, the computing unit RE may comprise a processor, wherein the processor is configured to determine the ACTUAL delivery volume is-fv.

ACCESSORIES

DP Dosing pump
B Container
D Dosing system
WA Vehicle wash
bds Container data set
fs digital level value
FSS analog level sensor
p digital pressure value
DS analog pressure sensor
ρ digital density value is-fv IST funding volume
ks Calibration signals
V Procedure
a)-f) Process steps, in particular reading in, determining, recording and providing
uds Environment parameter data set
sts Control signals
L Length value of the container
Br Width value of the container
K Characteristic value
AS Output interface
RE Calculation unit
HMI Human-machine interface
PLC Control system, especially programmable logic controller
MIX Mixer
AG Working unit
MA Measuring display with converter
DL Compressed air
LA Lance

The invention claimed is:

1. A method for determining an actual delivery volume for a dosing pump intended for delivering a substance from a container for use in a vehicle washing system, comprising the following method steps:
   a) reading in a container data record for the container from which the substance is to be delivered by means of the dosing pump, wherein the container data record is an electronic data record which is provided for the container, and wherein the container data record contains information about the design, size or a holding volume of the container;
   b) reading in a digital filling level value representing a filling level measured in the container by means of at least one analog level sensor, or
   c) reading in a digital pressure value representing a pressure measured in the container by means of at least one analog pressure sensor and reading in a digital density value for the substance to be delivered by the dosing pump;
   d) determining and outputting the actual delivery volume which has actually been delivered by the dosing pump, by applying a first function to the digital level value read in step b) and the container data record read in step a) or by applying a second function to the pressure value read in step c) and the density value read in step c) and the container data record read in step a).

2. The method according to claim 1, in which control signals for controlling the dosing pump are calculated from the actual delivery volume determined in step d) and optionally an environment parameter data set.

3. The method according to claim 2, in which the control signals control a clock frequency of a reciprocating piston of the dosing pump and/or in which the control signals control a target delivery volume.

4. The method according to claim 1, in which a reading-in of the digital density value for the substance to be delivered with the dosing pump is carried out via the reading-in of a code.

5. The method according to claim 1, in which the reading-in of the digital density value for the substance to be delivered with the dosing pump is carried out by an internal software routine which is used to reference the level value read in in step b) and the pressure measurement detected in step c) and a signal from a further sensor.

6. The method according to claim 1, wherein the first function f1 calculates the actual delivery volume calculated as follows ist-fv={fs×L×Br} in the case of the container which is formed with the at least one analog level sensor, where fs denotes the read-in digital level value, L denotes the length of the container and Br denotes the width of the container, and/or in which the second function f2 calculates the actual delivery volume calculated as follows ist-fv={h×L×Br}, where $$h = \frac{p}{\rho \times g}$$

in the case of the container formed with the at least one analog pressure sensor, where h denotes the filling level, L the length and Br the width of the container and p the measured pressure, p denotes the density value of the substance, and g denotes the acceleration due to gravity.

7. The method according to claim 1, wherein reading the container data record in step a) comprises reading a length value and width value for the container having a rectangular base.

8. The method according to claim 1, wherein reading in the container data record in step a) comprises reading in a radius value and optionally a height value for the container having a round base.

9. The method of claim 1, wherein a geometric three-dimensional model of the container is read-in, defining an area of the container versus height, such that a volume of the container is provided as a function of height.

10. The method according to claim 1, in which, in order to read in the digital pressure value in step c), the pressure in the container is measured using an internal and direct measurement method, in which the at least one pressure sensor is arranged in the container, or
   in which the pressure in the container is measured with an external and indirect measuring method, in which no pressure sensor is arranged in the container, but in which the measurement is carried out indirectly and using a lance for the application of compressed air, which is introduced into the container, in particular in the region of the container bottom.

11. The method according to claim 1, in which the dosing pump is operated for the container which is replaceable and/or refillable and/or which may have a variable size.

12. The method according to claim 1, in which the container is a storage container with a closable refill opening which is in fluid-mechanical connection to a mixer and/or to at least one working unit of the vehicle washing system.

13. The method according to claim 1, wherein the actual delivery volume determined in step d) is compared with a target delivery volume for conformance, and wherein a calibration indicator is automatically calculated to output a calibration request signal if the calculated calibration indicator exceeds a preconfigurable threshold and/or to initiate an error correction action.

14. The method according to claim 1, in which the determination of the actual delivery volume in step d) is carried out at least two measurement times, in particular immediately before the start and after the end of a vehicle wash of at least one vehicle, so that a difference calculation is applied to the respectively determined actual delivery volumes, which are each assigned to a measurement time, which difference calculation represents a volume difference between the two measurement times.

15. The method according to claim 1, in which the container data record (bds) is read in once in step a) or in which the filling level measured in step b) or in which the pressure measured in step c) and the density value read in in step c) are measured or read in several times in a configurable measuring time interval.

16. The method according to claim 1, in which, in addition, a number of strokes carried out with the dosing pump is recorded or the number of strokes is stored in temporal association with the measured values and in which the determined actual delivery volume per stroke is calculated.

17. The method according to claim 1, wherein the actual delivered volume determined in step d) is determined at least immediately before the start and immediately after the end of a washing program in order to determine a consumption of the delivered substance caused by the washing program.

18. The method according to claim 17, in which a characteristic value is read in which is used to uniquely identify the washing program executed by the vehicle washing system in order to calculate a washing program-specific consumption per washing program.

19. The method according to claim 1, in which the actual delivery volume determined in step d) is stored in an associated manner with a characteristic value for identifying a respectively executed washing program of the vehicle washing, the characteristic value indicating the substances used in the vehicle washing and/or its duration.

20. The method according to claim 1, further comprising automatic calibration of the dosing pump, where the dosing pump which is configured with an adjustment means for a manual adjustment of a target delivery volume per time unit, comprising the following method steps:
   1) detection of the target delivery volume per time unit set on the dosing pump, which has been set on the adjustment means;
   2) determining the actual delivery volume; and
   3) calculating and providing calibration signals for automatic calibration of the dosing pump on the basis of a calculated deviation between the detected set target delivery volume and the actual delivery volume.

21. A computer readable recording medium storing thereon instructions that when executed by a processor cause a computing unit to execute steps determining an actual delivery volume comprising:
   reading in a container data record for a container from which a substance is to be delivered by means of a dosing pump, wherein the container data record is an electronic data record which is provided for the container, and wherein the container data record contains information about a design, size, or a holding volume of the container;
   reading in a digital filling level value representing a filling level measured in the container by means of at least one analog level sensor, or
   reading in a digital pressure value representing a pressure measured in the container by means of at least one analog pressure sensor and reading in a digital density value for the substance to be delivered by the dosing pump;
   determining and outputting the actual delivery volume which has actually been delivered by the dosing pump, by applying a first function to the digital level value read in step b) and the container data record read in step a) or by applying a second function to the pressure value read in step c) and the density value read in step c) and the container data record read in step a).

* * * * *